US009151179B2

(12) United States Patent
Lacy et al.

(10) Patent No.: US 9,151,179 B2
(45) Date of Patent: Oct. 6, 2015

(54) TURBINE SHROUD SEGMENT COOLING SYSTEM AND METHOD

(75) Inventors: Benjamin Paul Lacy, Greer, SC (US); Stephen William Tesh, Simpsonville, SC (US); David Wayne Weber, Greenville, SC (US)

(73) Assignee: General Electric Company, Schenectady, NY (US)

( * ) Notice: Subject to any disclaimer, the term of this patent is extended or adjusted under 35 U.S.C. 154(b) by 402 days.

(21) Appl. No.: 13/086,279

(22) Filed: Apr. 13, 2011

(65) Prior Publication Data

US 2012/0263576 A1  Oct. 18, 2012

(51) Int. Cl.
*F01D 25/12* (2006.01)

(52) U.S. Cl.
CPC ............ *F01D 25/12* (2013.01); *F05D 2230/90* (2013.01); *F05D 2240/14* (2013.01); *F05D 2250/185* (2013.01); *F05D 2260/204* (2013.01); *Y02T 50/676* (2013.01); *Y10T 29/49229* (2015.01)

(58) Field of Classification Search
CPC .............. F01D 25/12; F01D 2260/204; F01D 2250/185; F01D 2230/90; F01D 2240/14
USPC .................................. 415/116, 115
See application file for complete search history.

(56) References Cited

U.S. PATENT DOCUMENTS

| 4,497,610 | A | * | 2/1985 | Richardson et al. | 415/116 |
|---|---|---|---|---|---|
| 4,573,866 | A | * | 3/1986 | Sandy et al. | 415/116 |
| 4,650,394 | A | * | 3/1987 | Weidner | 415/116 |
| 4,679,881 | A | * | 7/1987 | Galvin et al. | 439/392 |
| 4,679,981 | A | * | 7/1987 | Guibert et al. | 415/116 |
| 5,075,966 | A | * | 12/1991 | Mantkowski | 29/890.01 |
| 5,875,549 | A | * | 3/1999 | McKinley | 29/889.2 |
| 5,957,657 | A | * | 9/1999 | Akita et al. | 415/115 |
| 6,270,311 | B1 | * | 8/2001 | Kuwabara et al. | 415/110 |
| 6,340,285 | B1 | * | 1/2002 | Gonyou et al. | 415/116 |
| 6,375,425 | B1 | | 4/2002 | Lee et al. | |
| 6,461,107 | B1 | | 10/2002 | Lee et al. | |
| 6,461,108 | B1 | | 10/2002 | Lee et al. | |
| 6,499,949 | B2 | | 12/2002 | Schafrik et al. | |
| 6,511,762 | B1 | | 1/2003 | Lee et al. | |
| 6,528,118 | B2 | | 3/2003 | Lee et al. | |
| 6,551,061 | B2 | | 4/2003 | Darolia et al. | |
| 6,582,194 | B1 | | 6/2003 | Birkner et al. | |
| 6,599,568 | B2 | | 7/2003 | Lee et al. | |
| 6,617,003 | B1 | | 9/2003 | Lee et al. | |
| 6,761,956 | B2 | | 7/2004 | Lee et al. | |
| 6,893,215 | B2 | * | 5/2005 | Kuwabara et al. | 415/139 |
| 6,899,518 | B2 | * | 5/2005 | Lucas et al. | 415/116 |
| 6,905,302 | B2 | * | 6/2005 | Lee et al. | 415/115 |

(Continued)

OTHER PUBLICATIONS

U.S. Appl. No. 12/765,372, filed Apr. 22, 2010, Lacy et al.

(Continued)

*Primary Examiner* — Nathaniel Wiehe
*Assistant Examiner* — Brian O Peters
(74) *Attorney, Agent, or Firm* — Fletcher Yoder P.C.

(57) ABSTRACT

The present embodiments are generally directed toward systems and methods for cooling one or more shroud segments of a gas turbine engine. For example, in a first embodiment, a shroud segment is provided that is configured to at least partially surround a turbine blade of a turbine engine. The shroud segment includes a body and a microchannel disposed in the body. The microchannel is configured to flow a cooling fluid through the body.

20 Claims, 12 Drawing Sheets

(56) References Cited

U.S. PATENT DOCUMENTS

| | | | |
|---|---|---|---|
| 7,029,228 B2* | 4/2006 | Chan et al. ............... | 415/115 |
| 7,041,154 B2 | 5/2006 | Staroselsky et al. | |
| 7,168,914 B2* | 1/2007 | Shiozaki et al. ............ | 415/115 |
| 7,465,335 B2 | 12/2008 | Schmidt | |
| 7,487,641 B2 | 2/2009 | Frechette et al. | |
| 7,670,108 B2* | 3/2010 | Liang .................. | 415/173.1 |
| 8,480,353 B2* | 7/2013 | Koyabu et al. ............ | 415/116 |
| 2007/0041827 A1* | 2/2007 | Camus ................. | 415/116 |
| 2008/0211192 A1* | 9/2008 | Pietraszkiewicz et al. ... | 277/347 |
| 2012/0036858 A1* | 2/2012 | Lacy et al. .............. | 60/754 |

OTHER PUBLICATIONS

U.S. Appl. No. 12/943,563, filed Nov. 10, 2010, Bunker et al.
U.S. Appl. No. 12/943,624, filed Nov. 10, 2010, Bunker et al.
U.S. Appl. No. 12/943,646, filed Nov. 10, 2010, Bunker et al.
U.S. Appl. No. 12/953,177, filed Nov. 23, 2010, Bunker et al.
U.S. Appl. No. 12/965,083, filed Dec. 10, 2010, Bunker et al.
U.S. Appl. No. 12/966,101, filed Dec. 13, 2010, Bunker et al.
U.S. Appl. No. 12/975,609, filed Dec. 22, 2010, Bunker et al.
U.S. Appl. No. 13/026,595, filed Feb. 14, 2011, Bunker.

* cited by examiner

TURBINE SHROUD SEGMENT COOLING SYSTEM AND METHOD

BACKGROUND OF THE INVENTION

The subject matter disclosed herein relates to cooling parts of a turbine engine, and, more specifically, to cooling shroud segments of the gas turbine engine.

In general, gas turbines combust a mixture of compressed air and fuel to produce hot combustion gases. The combustion gases may flow through one or more turbines to generate power to drive a load, such as an electrical generator and/or a compressor. Within the gas turbines, the combustion gases may flow through one or more stages of nozzles and blades. The turbine nozzles may include circumferential rings of vanes that direct the combustion gases to the blades. As the combustion gases flow past the blades, the combustion gases drive the blades to rotate, thereby driving the load. The hot combustion gases may be contained using circumferential shrouds surrounding the blades, which also aid in directing a flow of the hot combustion gases through the gas turbine engine. Unfortunately, it is difficult to cool certain regions of the shrouds, such as intermediate seal regions between shroud segments. As a result, the shroud may be subject to hot spots and high thermal stresses in these regions.

BRIEF DESCRIPTION OF THE INVENTION

Certain embodiments commensurate in scope with the claimed subject matter are summarized below. These embodiments are not intended to limit the scope of the claims, but rather these embodiments are intended only to provide a brief summary of possible forms of the present disclosure. Indeed, the embodiments described herein may encompass a variety of forms that may be similar to or different from the embodiments set forth below.

In a first embodiment, a system includes a shroud segment configured to at least partially surround a turbine blade of a turbine engine, the shroud segment including a body and a microchannel disposed in the body. The microchannel is configured to flow a cooling fluid through the body.

In a second embodiment, a system includes a turbine shroud segment having a body with a seal region. The shroud segment also includes a plurality of microchannels disposed in the body, and the plurality of microchannels is configured to flow a cooling fluid through the body to cool the seal region.

In a third embodiment, a method includes forming a microchannel recess in a turbine shroud segment of a turbine engine. The method also includes covering the microchannel recess with a layer to define a microchannel cooling passage configured to cool a portion of the turbine shroud segment.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, in certain gas turbine engine embodiments, circumferential segments, which may form one or more annular shrouds, may surround turbine blades of the turbine engine. The shrouds, in a general sense, contain the hot combustion gases produced at the combustors of the gas turbine engine and also direct a flow of the combustion gases through a turbine section of the turbine engine. Therefore, during operation, the segments that form the annular shrouds, referred to herein as shroud segments, may heat to temperatures approaching those of the hot combustion gases. Unfortunately, in situations where such heating is not mitigated or controlled, the shroud may deteriorate, which can result in a decrease in performance or engine downtime. In some configurations, the shrouds may be cooled using cooling fluids that flow against a surface of the shroud segments that are opposite the surfaces that face the turbine blades. However, such cooling may not be sufficient to cool all portions of the shroud segments. Accordingly, the present disclosure provides embodiments where cooling channels, such as microchannels, are used to direct one or more flows of cooling fluid through a body of the shroud segments. Such channeling may allow cooling fluid to flow to portions of shroud segments that may otherwise be difficult to cool, such as areas proximate seal slots, trailing and/or leading edges, and so forth.

Figure 1:
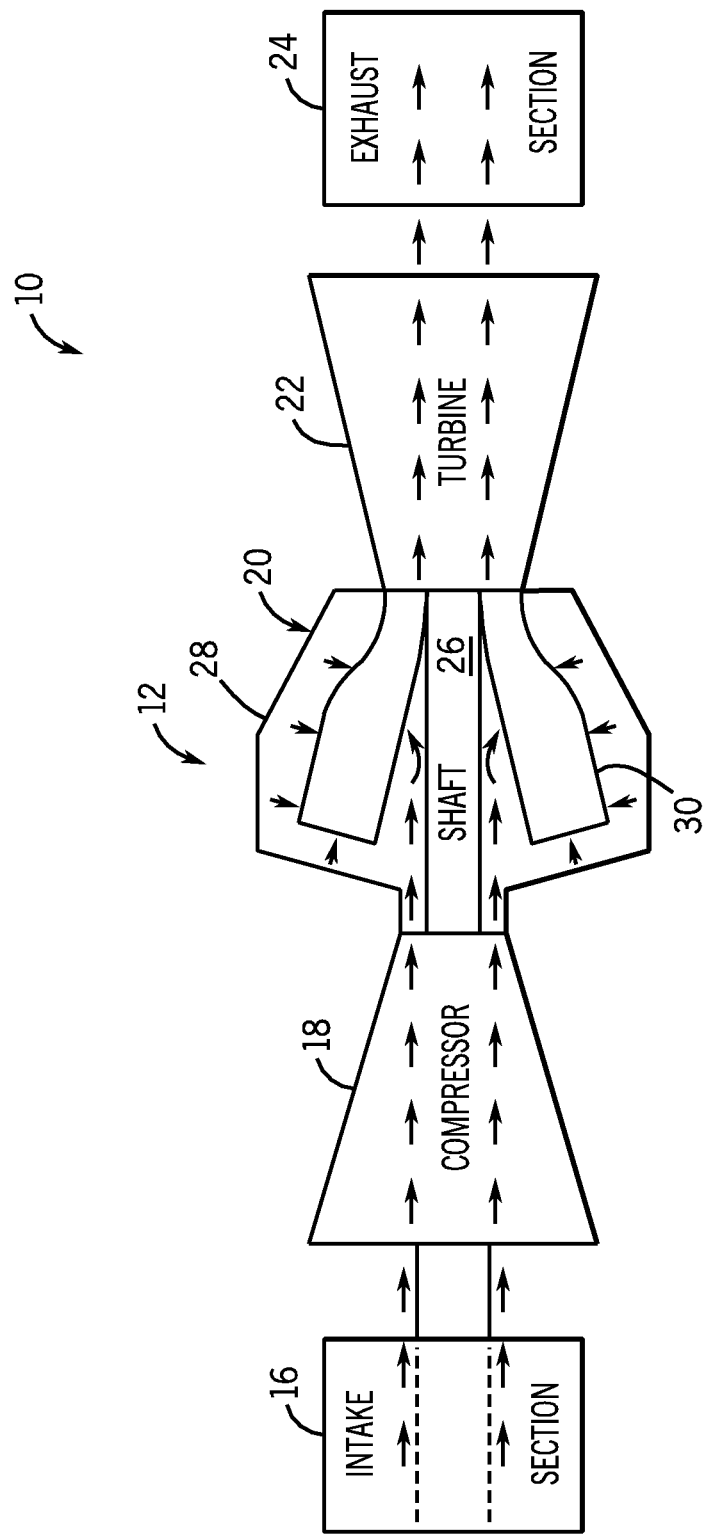
FIG. 1 is a schematic flow diagram of an embodiment of a gas turbine engine that may employ shroud segments having cooling channels.

It should be noted that while the present embodiments are described in the context of a gas turbine engine, the embodiments disclosed herein may also be used in conjunction with other turbomachinery having heated fluids, such as steam turbine engines. Moreover, while the present embodiments are discussed in the context of shroud segments disposed downstream from combustors of a gas turbine engine, it should be noted that the approaches described herein are also applicable to other shrouds and/or airfoils, such as shrouds disposed proximate a nozzle region of the gas turbine engine. Keeping in mind that the present embodiments are also applicable in such contexts, FIG. 1 depicts an embodiment of a system 10 including a gas turbine engine 12 that may employ the microchannels noted above for cooling one or more shroud segments. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the combustors 30 to drive the turbine 22. According to certain embodiments, multiple combustors 30 may be disposed in an annular arrangement within the combustor housing 28.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. As noted above, the turbine 22 may include a plurality of shroud segments that contain and guide the combustion gases through the turbine 22. Furthermore, embodiments of the shroud segments include microchannels to cool various regions of the shroud segments, as will be discussed in detail below. After flowing through the turbine 22, the hot combustion gases may exit the gas turbine engine 12 through the exhaust section 24.

Figure 2:
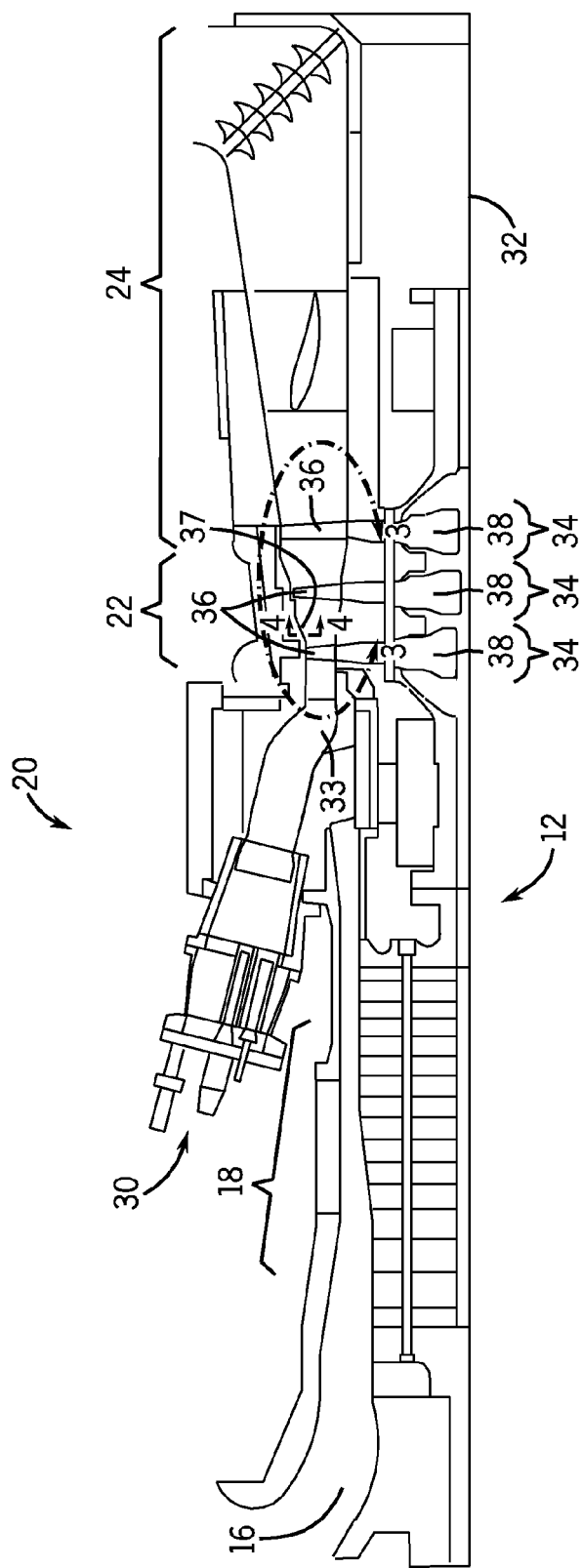
FIG. 2 is a sectional view of the gas turbine engine of FIG. 1 sectioned through a longitudinal axis of the engine.

FIG. 2 is a cross-sectional side view of an embodiment of the gas turbine engine 12 of FIG. 1 taken along a longitudinal axis 32. As described above with respect to FIG. 1, air enters the gas turbine engine 12 through the air intake section 16 and is compressed by the compressor 18. The compressed air from the compressor 18 is then directed to the combustors 30 to mix with a fluid fuel which combusts to generate hot combustion gases. As noted above, multiple combustors 30 may be annularly disposed within the combustor section 20. Each combustor 30 may include a transition piece 33 that directs the hot combustion gases from the combustor 30 to the gas turbine 22. In particular, each transition piece 33 may generally lead to a hot gas path from the combustor 30 to the turbine 22.

As depicted, the gas turbine 22 includes three separate stages 34. Each stage 34 includes a set of blades 36 coupled to a rotor wheel 38 that are rotatably attached to the shaft 26 (FIG. 1). Each set of blades 36 is disposed within a shroud 37, which contains the hot combustion gases to allow a motive force to be applied to the blades 36. Again, as will be discussed below, the shroud 37 may include an annular arrangement of individual segments, each segment having one or more microchannels to allow a cooling fluid to pass through their respective bodies to provide beneficial cooling. The hot combustion gases are directed toward the blades 36 where the hot combustion gases may apply motive forces to the blades 36 to rotate the blades 36, thereby turning the shaft 26. The hot combustion gases may then exit the gas turbine 22 through the exhaust section 24.

Although the turbine 22 is illustrated as a three-stage turbine, the microchannel-equipped shroud segments described herein may be employed in any suitable type of turbine with any number of stages and shafts. For example, the microchannel-equipped shroud segments may be included in a single stage turbine, in a dual turbine that includes a low-pressure turbine and a high-pressure turbine, or in a multi-stage turbine with three or more stages. Furthermore, the microchannel-equipped shroud segments may be included in a gas turbine, a steam turbine, a hydroturbine, or any other turbine.

Figure 3:
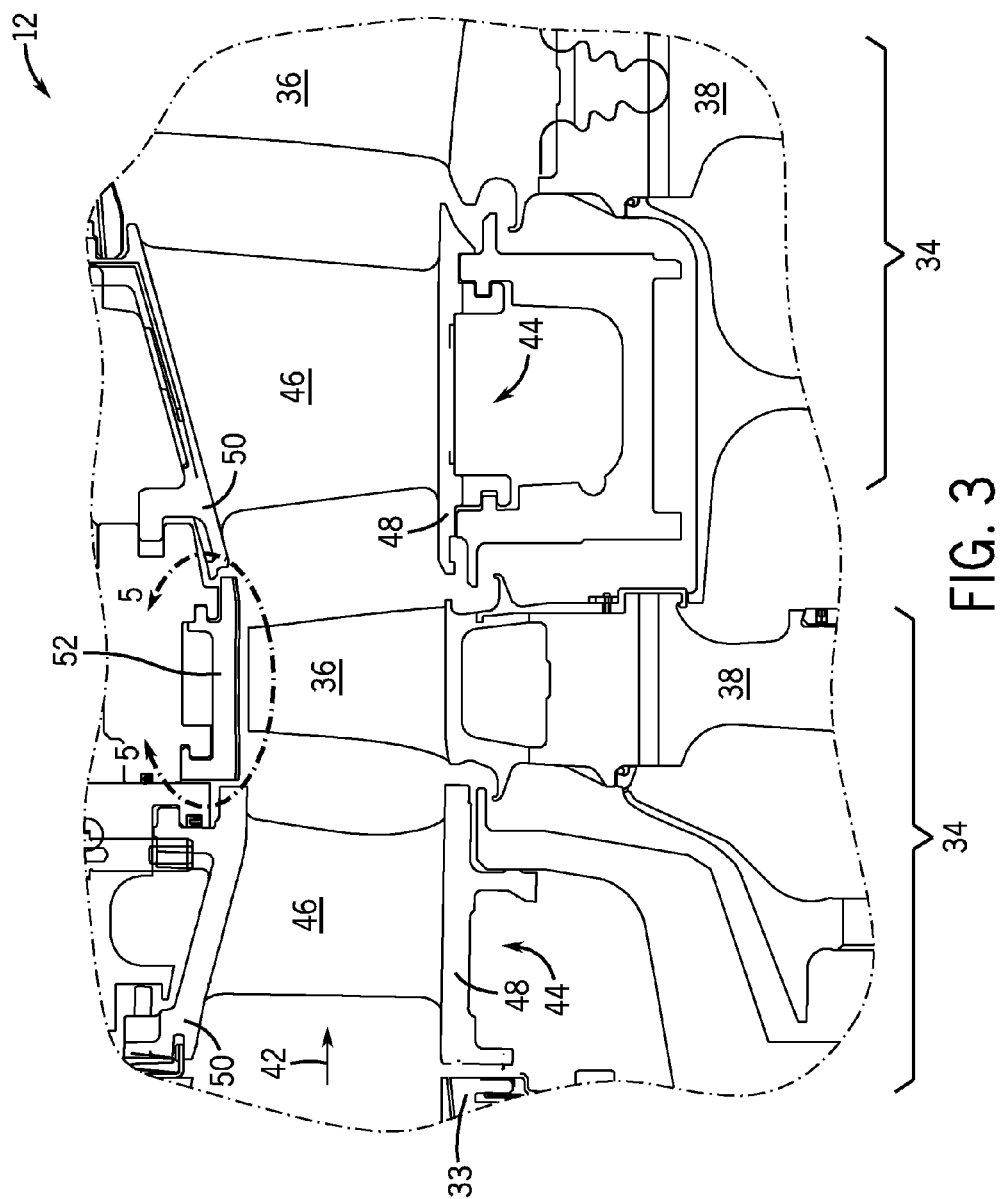
FIG. 3 is a partial sectional view of the gas turbine engine of FIG. 2 taken within line 3-3 and showing an embodiment of a turbine stage having a plurality of shroud segments.

FIG. 3 is a detailed view of an embodiment of the turbine 22 taken within line 3-3 of FIG. 2. During operation, the hot combustion gases may flow from the combustors 30 (FIG. 1) through the transition pieces 33 into the turbine 22 in a downstream direction 42. The turbine 22 includes nozzle assemblies 44 within each stage 34 to direct the hot combustion gases toward the blades 36. Each nozzle assembly 44 may include circumferentially spaced vanes 46 that extend between inner and outer band segments 48 and 50. In some embodiments, band segments 48 and 50 may also be cooled using the microchannel cooling approaches described herein. Adjacent outer band segments 50 may be coupled together to form an outer annular ring extending around an inner annular ring of adjacent inner band segments 48. The vanes 46 may generally extend between the two annular rings formed by the inner and outer band segments 48 and 50.

Shroud segments 52 that form the shroud 37 of FIG. 2 may be disposed downstream of the outer band segments 50 to direct hot combustion gases flowing past the vanes 46 to the blades 36. In particular, shroud segments 52 may be coupled together to form an outer annular ring (i.e., a shroud) that generally aligns with the outer annular ring formed by outer band segments 50. Discharge air from the compressor 18 (FIG. 2), which may act as a cooling fluid, may be directed through the vanes 46, the inner and outer band segments 48 and 50, and the shroud segments 52 to provide cooling of the vanes 46, the inner and outer band segments 48 and 50, and the shroud segments 52. In some embodiments, other cooling fluids may be used in addition to or in lieu of the discharge air, such as steam, recirculated exhaust gas, or fuel.

Again, the shroud segments 52 may be arranged circumferentially about the blades 36 to allow the hot combustion gases to provide motive forces to the blades 36. Accordingly, the discharge air from the compressor 18 (FIG. 2) is provided as a cooling fluid to mitigate or control the buildup of thermal energy on the hot side of the shroud segments 52 facing the blades 36. The annular arrangement of the shroud segments 52 may be further appreciated with respect to FIG. 4, which is a cross sectional view of the gas turbine engine 12 of FIG. 2 taken within section 4-4. In the illustrated embodiment, each shroud segment 52 includes a main body 60 having a first surface 62 (e.g., a radially inner surface), a second surface 64 (e.g., a radially outer surface), and third surfaces 66 (e.g., lateral or circumferential interface surfaces). When assembled in the gas turbine engine 12, the first surface 62 faces the blades 36 of FIG. 3 and, therefore, is the hot surface exposed to the hot combustion gases flowing through the turbine 22 (FIG. 2). Conversely, the second surface 64 faces away from the blades 36 and toward a flow of cooling fluid (e.g., the compressed air mentioned above), which facilitates cooling of the body 60 of the shroud segments 52. The third surfaces 66 connect the first surface 62 and the second surface 64, and face adjacent shroud segments 52 when the shroud (FIG. 2) is assembled.

Each third surface 66 includes a seal slot 68, which is a recess in the third surface 66 that allows the body 60 of the shroud segment 52 to receive a portion of a seal 70. The seals 70 connect each shroud segment 52 with adjacent shroud segments 52, and provide a seal between adjacent shroud segments 52 to block the hot combustion gases from escaping. In some embodiments, the body 60 may also include one or more flats, grooves, or recesses disposed in the body 60 proximate the seal slot 68, each of which may be used to form a cooling channel to cool the shroud segment 52. For example, in the illustrated embodiment, the shroud segment 52 includes a first channel 72 (e.g., a microchannel) disposed proximate the seal slot 68 between the seal slot 68 and the second surface 64. In certain embodiments, the first channel 72 may be formed by forming a flat, slot, groove, or recess 74 in the third surface 66, followed by covering the recess 74 with a layer 76, such as a cover layer. The process for forming the channels is discussed in further detail below with respect to FIGS. 19-26.

Additionally or alternatively, the shroud segments 52 may have channels disposed between the seal slot 68 and the first surface 62. In certain embodiments, the shroud segments 52 may include one or more second channels 78 (e.g., microchannels) formed by forming a flat, slot, groove, or recess 80 in the first surface 62 of the body 60, followed by covering the recess 80 with a layer 82. Layer 82 may be the same or different than the layer 76. Moreover, the size of the second channels 78 may be the same or different than the size of the first channels 72. Indeed, in certain embodiments, the first and second channels 72 and 78 may be microchannels having the same or different dimensions. For example, in accordance with certain embodiments, the channels 72 and 78 may be microchannels having widths between approximately 50 microns (μm) and 4 millimeters (mm) and depths between approximately 50 μm and 4 mm, as will be discussed below. For example, the microchannels may have widths and/or depths between approximately 100 μm and 3.75 mm, between approximately 200 μm and 3.5 mm, or between approximately 300 μm and 2 mm. In certain microchannel embodiments, the microchannels may have widths and/or depths less than approximately 50, 100, 150, 200, 250, 300, 350, 400, 450, 500, 600, 700, or 750 μm. While illustrated as square or rectangular in cross-section, the microchannels may be any shape that may be formed using grooving, etching, or similar techniques. Indeed, the microchannels may have circular, semi-circular, curved, or triangular, rhomboidal cross-sections in addition to or in lieu of the square or rectangular cross-sections as illustrated. The width and depth of the channel could vary throughout its length. Therefore, the disclosed flats, slots, grooves, or recesses may have straight or curved geometries consistent with such cross-sections. Moreover, in certain embodiments, the microchannels may have varying cross-sectional areas.

Advantageously, forming microchannels from any one or a combination of the first surface 62 or the third surface 66 may allow such channels to be formed on the shroud segments 52 without substantially changing certain design considerations with regard to the shroud segments 52. For example, the dimensions noted above may allow the first and second channels 72, 78 to be placed on the surfaces 62, 66 of the body 60 without substantially changing the position of certain features of the shroud segments 52, such as the seal slots 68. Moreover, forming such microchannels from recesses in the various surfaces of the body 60 may allow the channels to be formed on existing or as-formed shroud segments, rather than using coring to form new shroud segments having larger channels deeper within the body 60. That is, forming channels using coring techniques may require a larger thickness between the channel and the first surface 62 than is suitable using microchannels in accordance with the presently contemplated embodiments. However, in certain embodiments, casting processes may be utilized to form one or more channels disposed within the body 60, for example to connect one or more of the second channels 78 with one or more first channels 72. For example, connecting one of the first channels 72 with at least one of the second channels 78 may provide beneficial cooling of the shroud segment 52 proximate the seal slot 68. Indeed, the placement of the channels 72, 78 may allow cooling of the shroud segments 52 in areas that may be otherwise difficult to cool.

Figure 4:
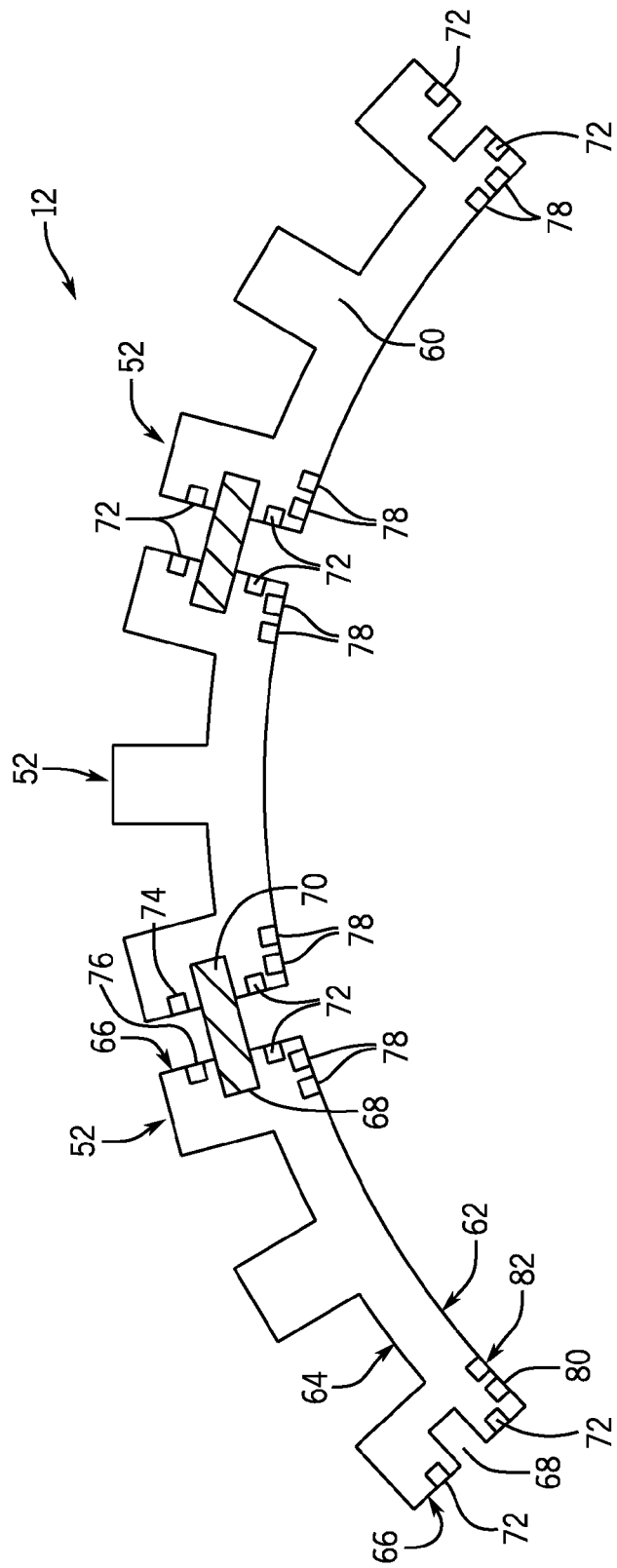
FIG. 4 is a partial sectional view of the gas turbine engine of FIG. 2 taken within line 4-4 and showing an embodiment of a plurality of shroud segments having cooling channels.
Figure 5:
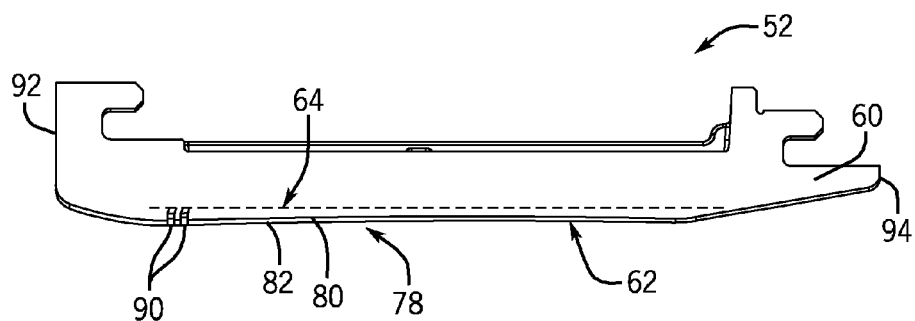
FIG. 5 is a side cross-sectional view of the shroud segment of FIG. 3 taken within line 5-5 and showing an embodiment of a plurality of fluid orifices leading to a plurality of cooling channels.

To allow cooling fluid (e.g., compressed air, oxygen enriched air, recirculated exhaust gas, fuel) to flow through each of the channels 72, 78, the second surface 64 may include one or more fluid orifices fluidly coupling the channels 72, 78 with the second surface 64. Therefore, cooling fluid flowing along and/or proximate the second surface 64 may flow through the fluid orifices and through the channels 72, 78. Such operation may be further appreciated with respect to FIG. 5, which is a cross sectional view of the shroud segment 52 of FIG. 3 taken within section 5-5. Specifically, FIG. 5 depicts the pair of second channels 78 illustrated in FIG. 4 as fluidly coupled to the second surface 64 by two fluid orifices 90. However, while two second channels 78 and two fluid orifices 90 are presently depicted, it should be noted that the shroud segment 52 may include only one second channel 78 coupled to one or more fluid orifices 90, or the shroud segment 90 may include a plurality (e.g., 2 or more) second channels 78, with each second channel 78 being fluidly coupled to one or more fluid orifices 90. Indeed, the number of first channels 72 (FIG. 4) in each shroud segment 52 may be 1, 2, 3, 4, 5, 6, 7, 8, 9, 10 or more, with each first channel 72 being connected to one or more fluid orifices. Additionally, the fluid orifices 90 may be approximately the same size or smaller than the channels 72, 78. Thus, the fluid orifices disclosed herein may have a diameter of between approximately 100 microns (μm) and 4 millimeters (mm). For example, the fluid orifices 90 may have diameters between approximately 50 μm and 4 mm, between approximately 250 μm and 3.25 mm, or between approximately 300 μm and 2 mm. In some embodiments, the fluid orifices 90 could be larger than the channel, for example overlapping one or more channels. Additionally or alternatively, multiple small supply orifices could run along the channels.

With regard to the shroud segment 52 illustrated in FIG. 5, during operation of the gas turbine engine 12 (FIGS. 1 and 2), hot combustion gases may contact the first surface 62, which can increase the temperature of the first surface 62 and other features of the shroud segment 52 in contact with the first surface 62. To counteract such heating, compressed air flows as a cooling fluid along the second surface 64, through one or more of the fluid orifices 90, and to the second channels 78. More specifically, the hot combustion gases may first contact a leading end 92 of the shroud segment 52, flow along the first surface 62 and the layer 82, and past a trailing end 94 of the shroud segment 52. Likewise, in the illustrated embodiment, cooling fluid (e.g., compressed air) flows along the second surface 64, through the fluid orifices 90, which are disposed closer to the leading end 92 than the trailing end 94, and into the channels 78. The placement of the fluid orifices 90 closer to the leading end 92 may cause the cooling fluid to flow within the channel 78 from the fluid orifices 90 in a path toward the trailing end 94. Additionally or alternatively, in some embodiments, the cooling fluid may flow from the fluid orifices 90 through the channels 78 in a path toward the leading end 92. The flow paths that are formed from the recesses in the first surface 62 and the third surface 66 are discussed in further detail below. Moreover, it should be noted that some or all of the channels disclosed herein and below with respect to FIGS. 9-16 may be configured to form channels that flow cooling fluid in opposite or alternating directions.

Figure 6:
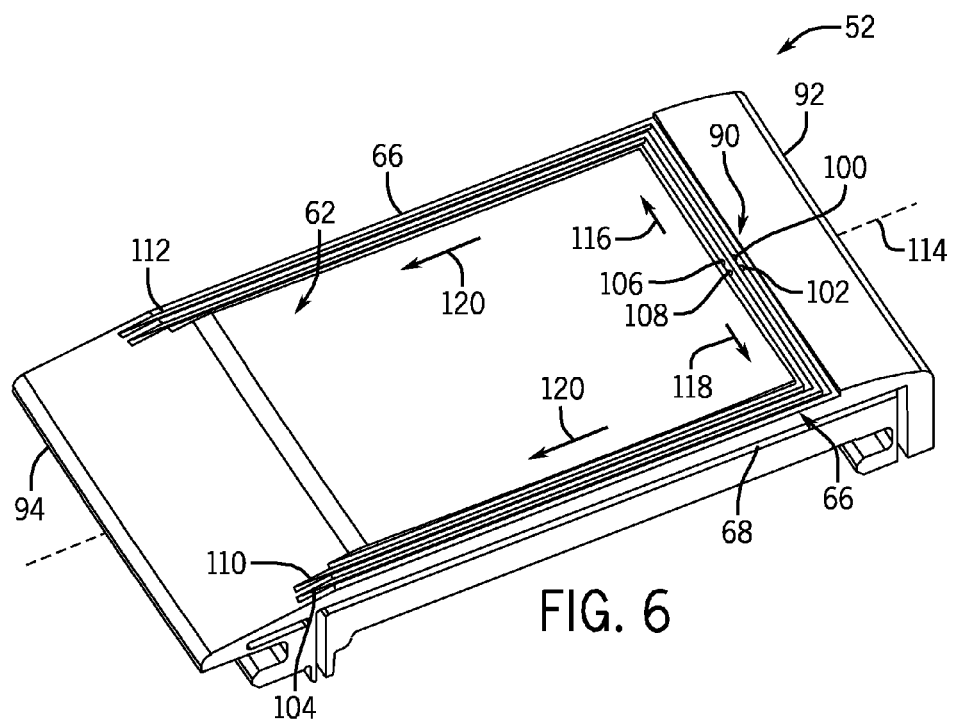
FIG. 6 is a perspective view of an embodiment of a shroud segment having a plurality of recesses that may be used to form cooling channels on a turbine blade-facing surface of the shroud segment.

FIG. 6 is a perspective view of an embodiment of the shroud segment 52 having the layer 82 removed to expose the recesses 80 (e.g., prior to placement of the layer 82). As noted above, the shroud segment 52 may include one or more flow paths originating at the fluid orifices 90. In the illustrated embodiment, the shroud segment 52 includes a first fluid orifice 100 and a second fluid orifice 102, disposed within an outer recess 104. The shroud segment 52 also includes a third fluid orifice 106 and a fourth fluid orifice 108 disposed within an inner recess 110. In the illustrated embodiment, the outer recess 104 and the inner recess 110 are formed in a flat 112 that has been grooved into the first surface 62, as discussed below. The outer recess 104 and the inner recess 110 both extend in crosswise directions with respect to a longitudinal axis 114 of the shroud segment 52. For example, the outer and inner recesses 104, 110 both extend in a first crosswise direction 116 and a second crosswise direction 118 toward the pair of third surfaces 66. The outer and inner recesses 104, 110 then turn to a first longitudinal direction 120 toward the trailing end 94 of the shroud segment 52. Again, the recesses, and thus the channels disclosed herein, may be configured to flow the cooling fluid in a direction toward and/or away from either end of the shroud segment 52. Thus, in certain embodiments, the outer 104 and/or inner recesses 110 may extend in one or more directions toward the trailing end 94 or the leading end 92, or both. The outer and inner recesses 104, 110 both extend toward the pair of third surfaces 66, and are disposed on the first surface 62 proximate the seal slots 68. In some embodiments, the outer and inner recesses 104, 110 may turn toward another direction, such as along an additional channel, before exiting (e.g., a channel running along the trailing end 94 of the shroud). Again, such a configuration may provide beneficial cooling to the areas proximate the seal slots 68, which may be difficult to accomplish in typical configurations not having channels.

To facilitate cooling of the shroud segment 52 proximate the seal slots 68 (among other regions of the shroud segment 52), the fluid orifices 100, 102, 106, 108 may be angled with respect to the first surface 62. For example, angling any or a combination of the fluid orifices 100, 102, 106, 108 may facilitate the flow of cooling fluid through the outer and inner channels 104, 110 in both crosswise directions 116, 118. In the illustrated embodiment, the first fluid orifice 100 and the third fluid orifice 106 may both be angled toward the third surface 66 along direction 116, while the second fluid orifice 102 and the fourth fluid orifice 108 may both be angled toward the third surface 66 along the direction 118. As an example, the angle of any or all of the fluid orifices 100, 102, 106, 108 may be between approximately 1 and 90 degrees, such as between approximately 10 and 75 degrees, approximately 15 and 60 degrees, or approximately 20 and 45 degrees from the first surface 62.

Figure 7:
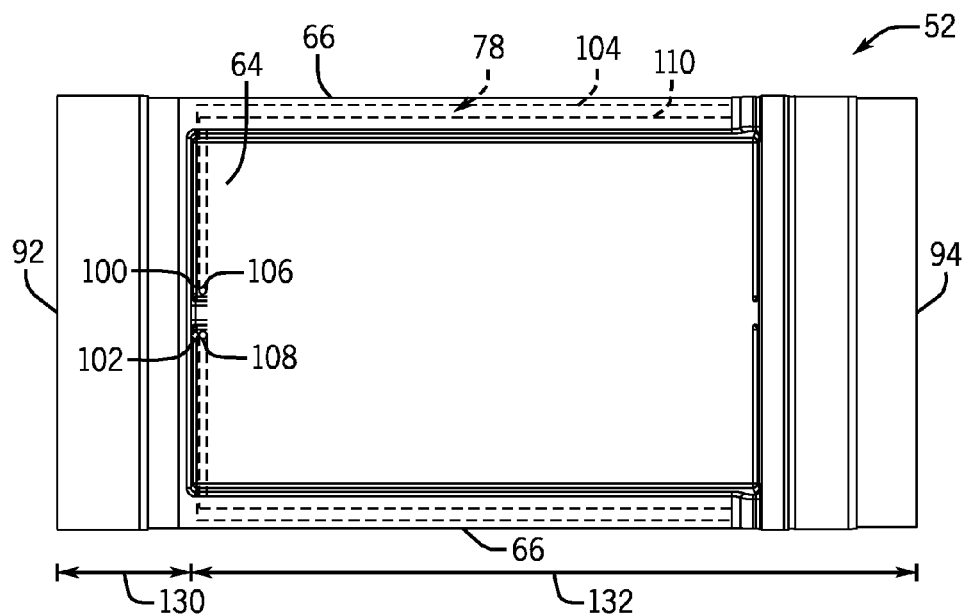
FIG. 7 is a plan view of a front surface of the shroud segment of FIG. 6 and showing an embodiment of a plurality of fluid orifices leading to the plurality of cooling channels.

FIG. 7 is a plan view of the shroud segment 52 illustrating an embodiment of the second surface 64. Specifically, the illustrated embodiment depicts the second surface 64 as including the fluid orifices 100, 102, 106, 108, which lead to the outer and inner recesses 104, 110. As noted above, during operation, cooling fluid flows along the second surface 64 and through the fluid orifices 100, 102, 106, 108, which lead to the channels that are formed from the recesses 104, 110. The manner in which the shroud segment 52 is cooled may depend on various factors including but not limited to the flow path defined by the recesses formed within the first surface 62 and/or the third surface 66, as well as the placement of the fluid orifices 100, 102, 106, 108. In certain embodiments, it may be desirable for the recesses 104, 110 to generally follow the seal slot 68 to provide beneficial cooling. Additionally, the placement of the fluid orifices 100, 102, 106, 108 may determine which areas of the shroud segment 52 receive the coolest air (i.e., the air that is entering the channels), and which areas may be designated as cooling fluid outlets. Again, the fluid orifices 100, 102, 106, 108 may be placed closer to the leading end 92 or closer to the trailing end 94. Depending at least on the placement of the fluid orifice, the resulting channel could run toward the leading end 92 rather than toward the trailing end 94. In the illustrated embodiment, a distance 130 between the first and second fluid orifices 100, 102 and the leading end 92 is smaller than a distance 132 between the first and second fluid orifices 100, 102 and the trailing end 94. Therefore, in the illustrated embodiment, the leading end 92, which may contact combustion gases having a higher temperature than those contacted at the trailing end 94, may receive fresh cooling fluid. However, in other embodiments, the distance 130 may be greater than the distance 132. In such embodiments, the fluid orifices 100, 102, 106, 108 may be placed closer to the trailing end 94. Alternatively or additionally, the recesses 104, 110 may run longer or shorter along the first surface 62 and/or the third surface 66, with varying patterns, lengths, widths, and so on. In some embodiments, one or more additional recesses may allow the flow to continue going along first surface 62, such as along the trailing end 94. Keeping in mind that the recesses may be formed in the first surface 62 and/or the third surface 66 in a variety of configurations, FIGS. 8-16 illustrate various embodiments of the recesses that may be formed in the first surface 62.

Figure 8:
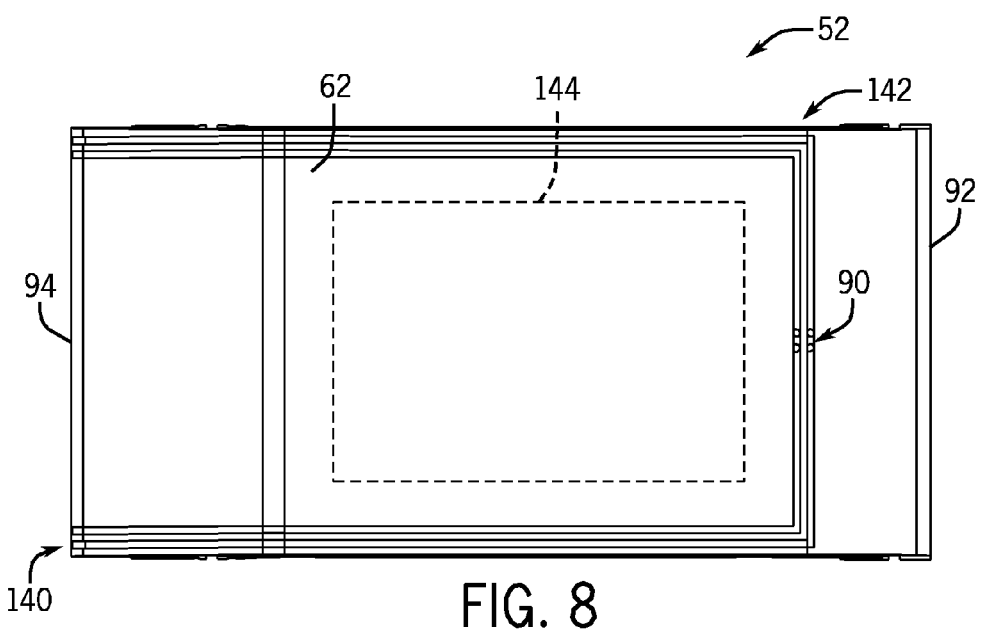
FIG. 8 is a plan view of another embodiment of a turbine blade-facing surface of a shroud segment having a plurality of recesses that may be used to form a plurality of cooling channels.

During operation of the gas turbine engine 10 of FIG. 1, various edges, such as the trailing edge 94, among others, may experience an increased amount of exposure to hot gases compared to other surfaces. Therefore, as noted above, sides, corners, edges, and so forth may develop hot spots/regions. FIG. 8 illustrates a plan view of an embodiment of the shroud segment 52 having recesses 140 that extend from a forward area 142 proximate the leading edge 92 and toward the trailing edge 94. Therefore, the embodiment illustrated in FIG. 8 enables cooling channels to be formed through the trailing edge 94. Furthermore, while the fluid orifices 90 are illustrated as disposed at the forward area 142 proximate the leading edge 92, in other embodiments, the fluid orifices 90 may be positioned closer to the trailing edge 94, as noted above. In such embodiments, cooling fluid may flow from the trailing end 94 toward leading end 92. Moreover, as discussed below, the cooling channels may also run along both the trailing end 94 and the leading end 92, rather than only one end. In such a configuration, distance 132 of FIG. 7 could be shorter than the distance 130 of FIG. 7.

Figure 9:
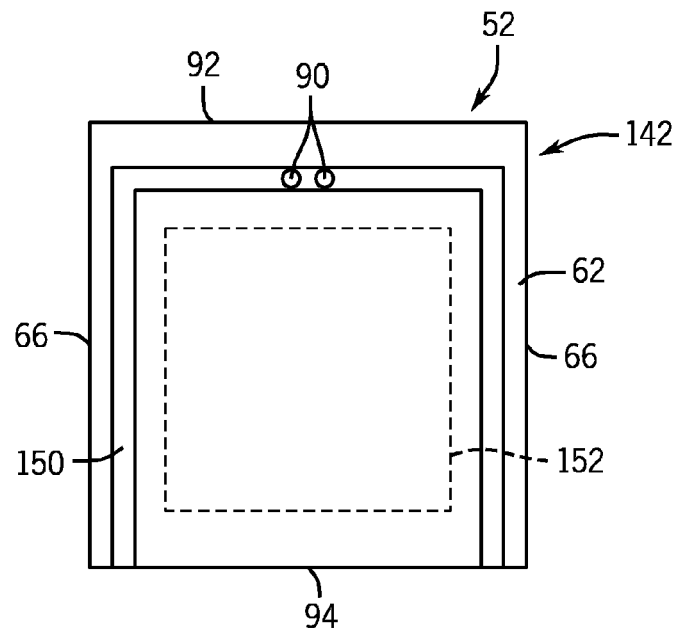
FIG. 9 is a plan view of another embodiment of a turbine blade-facing surface of a shroud segment having a recesses that may be used to form a cooling channel.

FIG. 9 is a plan view illustrating an embodiment of the shroud segment 52 having a single recess 150. Two fluid orifices 90 are disposed at the forward portion 142 of the shroud segment 52, each of which is configured to provide cooling fluid (e.g., air). In the illustrated embodiment, the recess 150 may be formed into a channel that flows cooling fluid from a central portion 152 of the shroud segment 52 and outward toward each of the third surfaces 66 (i.e., the sides of the shroud segment 52) proximate the seal slot 68. The recess 150 extends toward the third surfaces 66 in this manner and then bends or turns to extend toward the trailing edge 94. Specifically, in some embodiments, the recess 150 may extend toward the trailing edge 94 substantially directly between the seal slot 68 (FIG. 4) and the first surface 62 such that cooling fluid cools the seal slot.

Figure 10:
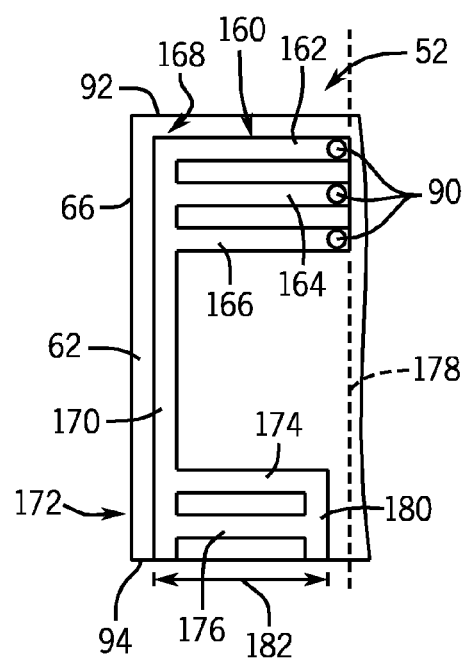
FIG. 10 is a plan view of another embodiment of a turbine blade-facing surface of a shroud segment having a plurality of recesses that converge to flow along a side of the shroud segment and then diverge at an end distal from the fluid orifices of the recesses.

FIG. 10 is a plan view illustrating an embodiment of the shroud segment 52 having a plurality of recesses 160 that converge and diverge. To provide a concise description of varying recess embodiments, only a portion of the shroud segment 52 is illustrated in FIGS. 10-18. Keeping in mind that the plurality of recesses 160 may include 2, 3, 4, 5, 6, 10, or more recesses, the illustrated embodiment depicts three recesses 162, 164, 166 that each extend from fluid orifices 90 toward the third surface 66. At an area 168, which in some embodiments may be proximate the seal slot 68 (FIG. 4), the recesses 162, 164, 166 converge into a common recess 170. The common recess 170 extends toward the trailing edge 94 to a rear portion 172. While a portion of the common recess 170 extends to the trailing edge 94, a first diverging recess 174 and a second diverging recess 176 extend toward a center of the first surface 62, which is represented as a center line 178. The first and second diverging recesses 174, 176 then reconverge to form a second common recess 180 that extends to the trailing edge 94. It will be appreciated that such a configuration may provide beneficial cooling along a length 182 of the trailing edge 94, as opposed to only at a portion of the trailing edge 94 proximate the seal slot 68 (FIG. 4).

Figure 11:
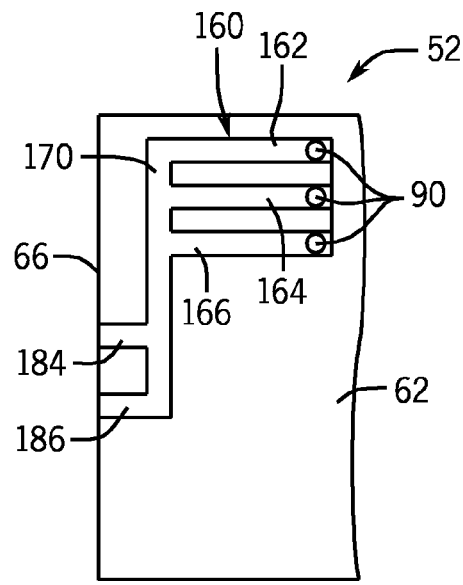
FIG. 11 is a plan view of another embodiment of a turbine blade-facing surface of a shroud segment having recesses that converge to flow along a side of the shroud segment and then diverge toward a side of the shroud segment.

FIG. 11 illustrates a plan view of an embodiment of the shroud segment 52 that is similar to the embodiment illustrated in FIG. 10. Specifically, the recesses 162, 164, 166 converge in to the common recess 170 as in FIG. 10, but the common recess 170 diverges into a first diverging path 184 and a second diverging path 186 that extend to the third surface 66. Such a configuration may enable a cooling channel to be formed that flows cooling fluid along a length proximate the seal slot 68 (FIG. 4), and then outward to the third surface 66. This may provide beneficial cooling to the shroud segment 52 in areas between adjacent shroud segments 52 in addition to the areas proximate the seal slot 68.

Figure 12:
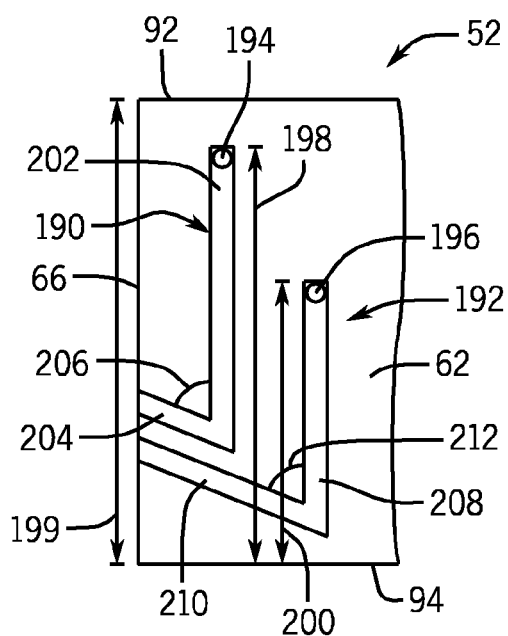
FIG. 12 is a plan view of another embodiment of a turbine blade-facing surface of a shroud segment having recesses that extend along a length of the shroud segment and then bend toward a side of the shroud segment.

In other embodiments, it may be desirable to provide cooling along the first surface 62 in a manner that directs cooling fluid along a length of the first surface 62 and outward toward the third surfaces 66. FIG. 12 illustrates a plan view of such an embodiment of the shroud segment 52. Specifically, the illustrated embodiment includes first and second recesses 190, 192 formed in the first surface 62. The first and second recesses 190, 192 each extend toward the trailing edge 94 from respective first and second fluid orifices 194, 196 disposed at different lengths 198, 200 from the trailing edge 94, and then bend or turn toward the third surface 66. In some embodiments, the lengths 198, 200 may be the same or different. For example, the lengths may differ by between 10% and 90%, such as between approximately 20% and 80%, approximately 30% and 70%, or approximately 40% and 60%. Additionally, the lengths 198, 200 may span between 10% and 90% of a length 199 of the first surface 62, such as between approximately 20% and 80%, approximately 30% and 70%, or approximately 40% and 60%.

The first recess 190 includes a first portion 202 extending toward the trailing edge 94 and a second portion 204 extending from the first portion 202 at an angle 206. The first portion 202 may span substantially the entire length 199, or may span between approximately 20% and 90% of the length 199 prior to extending into the second portion 202. For example, the first portion may span between approximately 30% and 80%, approximately 40% and 70%, or approximately 50% and 60% of the entire length 199. The angle 206 may be an acute or an obtuse angle. For example, the angle 206 may be between approximately 1 and 180 degrees, such as between approximately 10 and 170 degrees, approximately 20 and 160 degrees, approximately 30 and 150 degrees, approximately 40 and 150 degrees, approximately 50 and 140 degrees, approximately 60 and 130 degrees, approximately 70 and 120 degrees, approximately 80 and 110 degrees, or approximately 90 and 100 degrees. Therefore, the first and second recesses 190, 192 may allow channels to be formed that are able, during operation, to direct the cooling fluid first toward the trailing edge 94 and then toward the third surface 66 (i.e., the sides of the shroud segment 52). This may enable portions of the shroud segment 52 having higher temperatures, such as the leading and trailing edges 92, 94 and side surfaces 66, to receive the coolest cooling fluid.

In a manner similar to the first recess 190, the second recess 192 includes a first portion 208 and a second portion 210 extending from the first portion 208 at an angle 212. It will be appreciated that the geometrical relationships between the first portion 208 and the second portion 210 of the second recess 192 may include ranges that are similar or the same as those described above with respect to the first recess 190. Thus, the first portion 208 of the second recess 192 may span substantially the entire length 199, or may span between approximately 20% and 90% of the length 199 prior to extending into the second portion 210. For example, the first portion 208 may span between approximately 30% and 80%, approximately 40% and 70%, or approximately 50% and 60% of the entire length 199. The angle 212 may be an acute or an obtuse angle, such as the angles described above for angle 206. In some embodiments, the fluid orifice 196 of the second recess 192 may be disposed closer to the third surface 66, which could provide counterflow of the cooling fluid.

Figure 13:
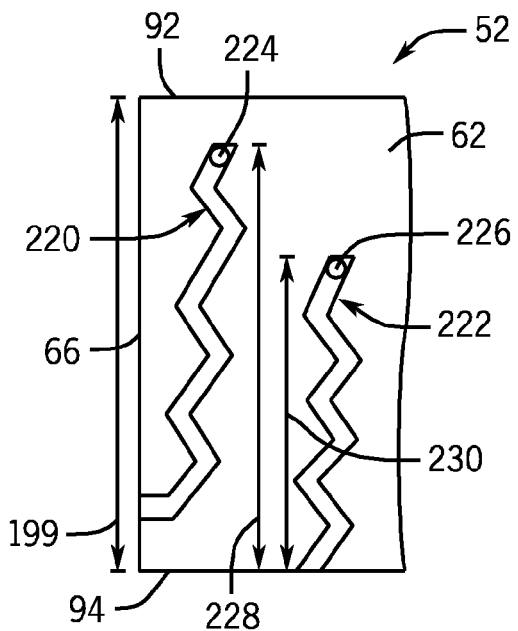
FIG. 13 is a plan view of another embodiment of a turbine blade-facing surface of a shroud segment having recesses that zig-zag along a length of the shroud segment.

In other embodiments, rather than having recesses with only a single bend, it may be desirable to increase the surface area coverage by each of the recesses. FIG. 13 is a plan view of an embodiment of the shroud segment 52 having first and second recesses 220, 222 that extend from respective fluid orifices 224, 226 in zig-zag patterns toward the trailing edge 94. In the illustrated embodiment, the first and second fluid orifices 224, 226 are disposed at different lengths 228, 230 from the trailing edge 94. However, in other embodiments, the lengths 228, 230 may be the same. Generally, the lengths 228, 230 may span between 10% and 90% of the length 199 of the first surface 62, such as between approximately 20% and 80%, approximately 30% and 70%, or approximately 40% and 60%. Additionally, in some embodiments, either or both of the first recess 220 or the second recess 222 may lead to the third surface 66, rather than the trailing edge 94. In the illustrated embodiment, the first recess 220 extends from the fluid orifice 224 toward the trailing edge 94, and turns toward and ends at the third surface 66. In other embodiments, two adjoining recesses, such as the first and second recesses 220, 222 could be connected proximate the third surface 66 such that flow runs down one recess then back up the other to exit. Additional recesses could similarly be connected allowing two, three, or more passes for coolant to flow up and down the surface or part of the surface. In still further embodiments, the first recess 220 may extend from the fluid orifice 224 toward the leading edge 92, and then turn toward the third surface 66.

Figure 14:
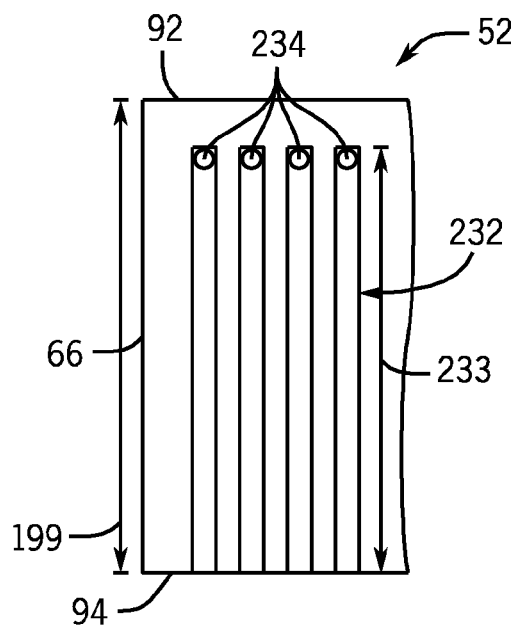
FIG. 14 is a plan view of another embodiment of a turbine blade-facing surface of a shroud segment having recesses that run substantially parallel along a length of the shroud segment.

While various of the embodiments described above depict recesses having bends, angles, zig-zag patterns, and so forth, it may be desirable to cool the first surface 62 using one or more substantially straight recesses. FIG. 14 is a plan view of an embodiment of the shroud segment 52 having a plurality of recesses 232 extending in substantially straight lines from a plurality of fluid orifices 234 to the trailing edge 94. In the illustrated embodiment, the plurality of recesses 232 are disposed in a substantially parallel fashion with respect to each other and the third surface 66. Further, while the fluid orifices 234 are depicted as being substantially aligned with one another with respect to the length 199 of the shroud segment 52 in the illustrated embodiment, the fluid orifices 234 may be staggered or otherwise not aligned in other embodiments. For example, each of the fluid orifices 234 may be located at equal or different positions between approximately 1% and 99% of the length 199 of the shroud segment 52. By further example, the recesses 232 may extend equal or different lengths 233 between approximately 10% and 90%, approximately 20% and 80%, approximately 30% and 70%, or approximately 40% and 60% of the length 199. Again as noted above, it may be desirable in some embodiments to alternate the flow of cooling fluid along the first surface 62. Thus, some or all of the recesses 232 may extend toward the leading edge 92 rather than the trailing edge 94. In other embodiments, the recesses 232 may extend from side to side, i.e., from one third surface 66 to the other surface 66. In certain of these embodiments, some or all of the recesses 232 may be aligned substantially parallel to the leading and/or trailing ends 92, 94.

Figure 15:
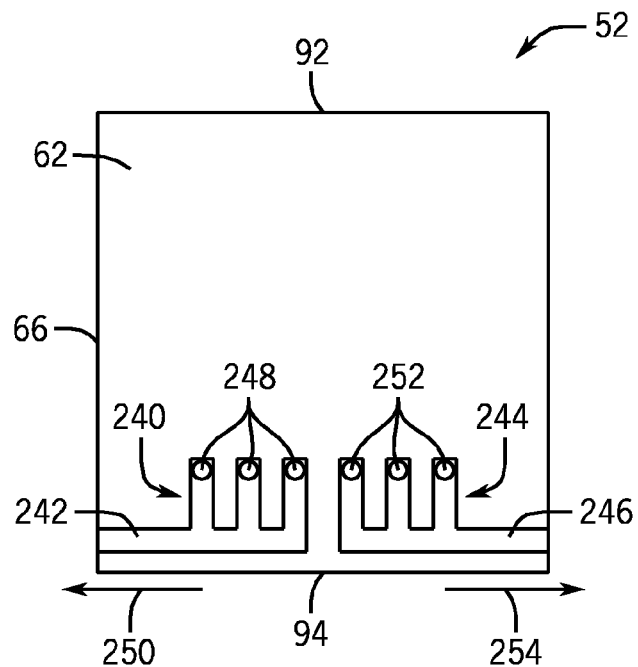
FIG. 15 is a plan view of another embodiment of a turbine blade-facing surface of a shroud segment having recesses that converge at an end of the shroud segment and then diverge toward a side of the shroud segment.

In certain embodiments, it may be desirable to cool either or both of the leading end 92 or the trailing end 94 along its entire length. FIG. 15 is a plan view of an embodiment of the shroud segment 52 having a first plurality of recesses 240 that converge to a common recess 242, and a second plurality of recesses 244 that converge to a second common recess 246. The first and second common recesses 242, 246 may enable cooling along the entire length, or at least substantially the entire length, of the trailing edge 94. In the illustrated embodiment, the first plurality of recesses 240 extend toward the trailing edge 94 from first fluid orifices 248. The first plurality of recesses 240 then converge to the first common recess 242, which extends in a first direction 250 toward the third surface 66. Such a configuration allows cooling fluid to flow in the first direction 250 along the trailing edge 94 and exit the shroud segment 52 at the third surface 66. The second plurality of recesses 244 extend toward the trailing edge 94 from second fluid orifices 252. The second plurality of recesses 244 then converge to the first common recess 246, which extends in a second direction 254 toward the third surface 66. Such a configuration allows cooling fluid to flow in the second direction 254 along the trailing edge 94 and exit the shroud segment 52 at the third surface 66. In other embodiments, a similar configuration could be used around the leading end 92.

Figure 16:
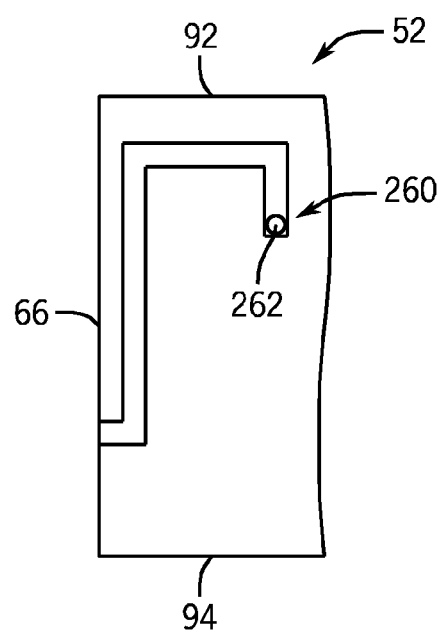
FIG. 16 is a plan view of another embodiment of a turbine blade-facing surface of a shroud segment having recesses that extend toward a leading end of the shroud segment, then bend to extend toward a trailing end of the shroud segment, and then bend again to extend to a side of the shroud segment.

To cool the shroud segment 52 using the disclosed channels at areas proximate the leading edge 92, the seal slot 68, and/or the trailing edge 94, it may be desirable to have one or more channels that extend in a number of directions toward and away from such areas. Such an embodiment is depicted in FIG. 16, which illustrates the shroud segment 52 having a recess 260 extending from a fluid orifice 262 toward the leading edge 92. The recess 260 then extends toward the third surface 66, followed by another bend toward the trailing edge 94 and generally following the positioning of the seal slot 68 (FIG. 4). The recess 260 may extend fully or partially toward the trailing edge 94. Alternatively or additionally, the recess 260 may extend fully or partially toward the third surface 66. In the illustrated embodiment, the recess 260 terminates at the third surface 66. Therefore, the recess 260 may allow beneficial cooling of the shroud segment 52 proximate the areas mentioned above.

The channels used for cooling, as described herein, may be formed from one or more recesses within the first surface 62, the second surface 64, or the third surface 66, or a combination thereof. The recesses may be grooved out of these surfaces and covered with a layer to form the channels. In a general sense, the channels may be formed using any method capable of forming recesses in a surface, such as etching, grinding, grooving, waterjet, laser, or EDM. Accordingly, non-limiting examples of methods for forming the disclosed channels are discussed with respect to FIGS. 17-24. Again, these channels may allow cooling fluid to be flowed through the body 60 (FIG. 4) of the shroud segment 52 in which they are formed. As noted above, it can be difficult to cool shroud segments 52 in areas proximate the seal slots 68 due to the limited space between the seal slots 68 and the first surface 62. Accordingly, it will be appreciated that the methods described herein may be applicable to new and/or existing shroud segments capable of harnessing cooling fluid for cooling purposes.

Figure 17:
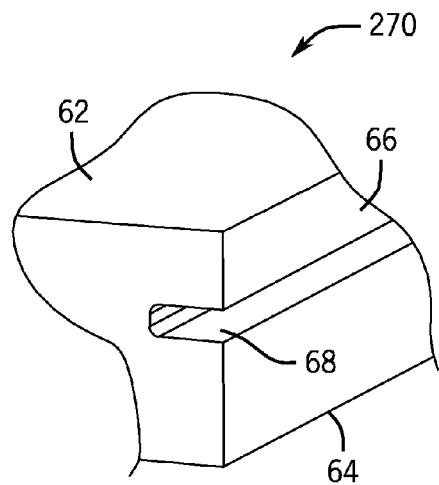
FIG. 17 is a cutaway view of an embodiment of a shroud segment prior to forming cooling channels.

FIG. 17 is a cutaway view of a portion of an as-formed shroud segment 270, such as a shroud segment produced as part of a casting or other shroud segment-forming procedure. The as-formed shroud segment 270 includes the first surface 62, the second surface 64, and the opposite third surfaces 66 as discussed above. Additionally, the as-formed shroud segment 270 includes the seal slot 68. However, in some embodiments, the disclosed methods do not form the seal slot 68 prior to forming the disclosed channels (e.g., microchannels).

Figure 18:
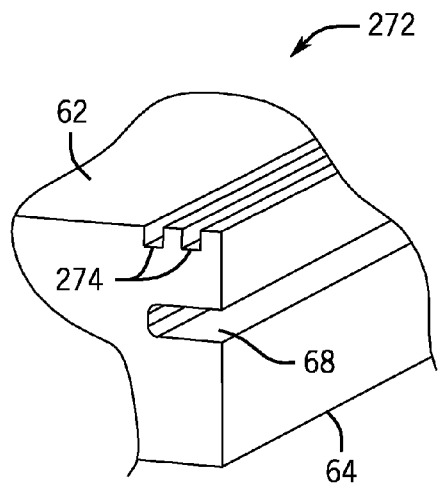
FIG. 18 is a cutaway view of an embodiment of the shroud segment of FIG. 17 after recesses have been formed.

As illustrated in FIG. 18, the as-formed shroud segment 270 may be machined to generate a machined shroud segment 272. The machined shroud segment 272 includes one or more recesses 274, which may be used to form the channels described herein. As an example, each of the recesses 274 may have widths between approximately 50 microns (μm) and 4 millimeters (mm) and depths between approximately 50 μm and 4 mm. For example, the recesses 274 may have widths and/or depths between approximately 100 μm and 3.75 mm, between approximately 200 μm and 3.5 mm, or between approximately 300 μm and 2 mm. To form the channels, the recesses 274 may be covered with a covering layer. Prior to applying the layer, however, it may be desirable to fill the recesses 274 with a filler material to avoid layer material encroaching into the recesses 274.

Figure 19:
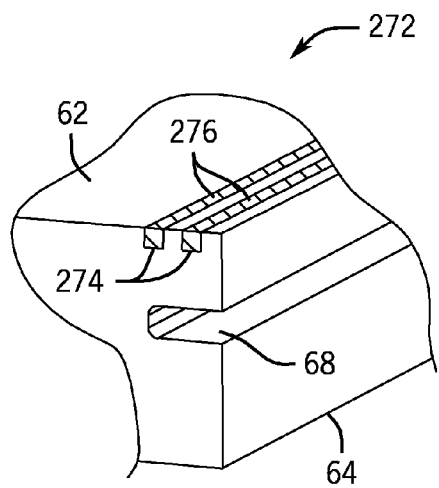
FIG. 19 is a cutaway view of an embodiment of the shroud segment of FIG. 18 after the recesses have been filled with a filler material.
Figure 20:
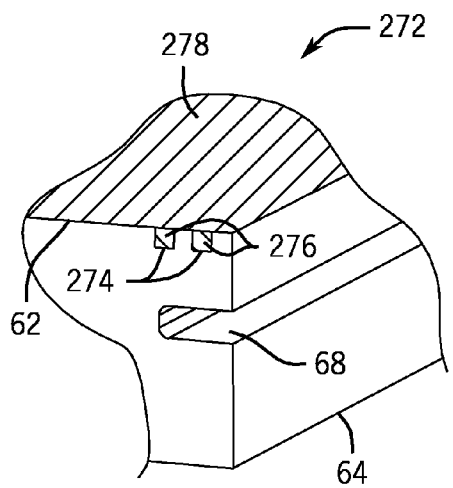
FIG. 20 is a cutaway view of an embodiment of the shroud segment of FIG. 19 after the recesses have been covered with a layer.

FIG. 19 illustrates an embodiment of the shroud segment 272 having filler material 276 disposed within the recesses 274. The filler material 276 may be a material that can be selectively withdrawn with respect to the layer that will be disposed over the recesses 274. As an example, the filler material 276 may include a metal-based material (e.g., a copper based compound) that can be leached out As illustrated in FIG. 20, upon placing the filler material 276 within the recesses 274, a topcoat 278, such as a bondcoat, may be applied either to the entire first surface 62, or on top of an area encompassing the recesses 274. Due to the specific tolerances within the turbine 22 (FIGS. 1-3), it may be desirable to apply the topcoat 278 in a thickness that may not substantially affect the performance of the shroud segment that results from the method disclosed herein. As a non-limiting example, the thickness of the topcoat 278 may be between approximately 10 μm and 1 mm. For example, the thickness of the topcoat 278 may be between approximately 50 μm and 1 mm, approximately 100 μm and 500 μm, approximately 200 μm and 400 μm, or approximately 250 μm and 350 μm.

Figure 21:
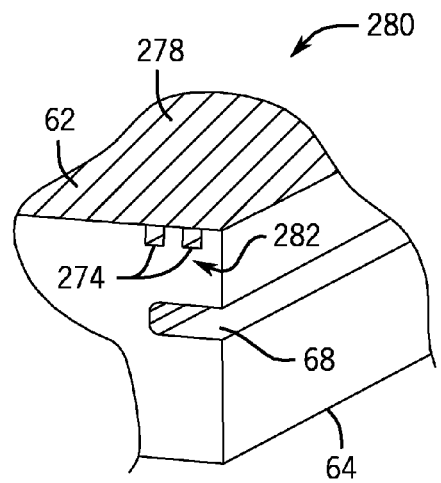
FIG. 21 is a cutaway view of an embodiment of the shroud segment of FIG. 20 after the filler material has been removed from the recesses to form the cooling channels.

FIG. 21 illustrates a microchannel equipped shroud segment 280 having a pair of cooling channels 282 that are formed by removing the filler material 276 from the recesses 274 after applying the topcoat 278. As an example, the filler material 276 may be removed using an aqueous and/or organic solvent.

Figure 22:
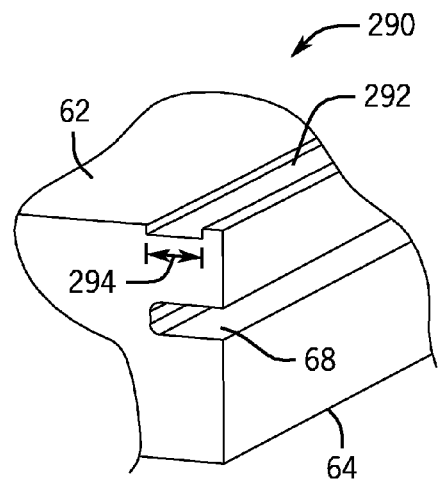
FIG. 22 is a cutaway view of an embodiment of a shroud segment having grooved flats prior to forming cooling channels.

In another method to form the cooling channels described herein, the as-formed shroud segment 270 described with respect to FIG. 17 may be machined to form a machined shroud segment 290, which is illustrated in FIG. 22. The machined shroud segment 290 includes a platform recess 292, which may be considered a support for a cover insert, as will be described below, having a width 294 that is sufficient to allow a desired number of recesses to be formed within the platform recess 292. For example, the width 294 may allow 1, 2, 3, 4, 5, 6, 8, 9, 10 or more recesses to be formed.

Figure 23:
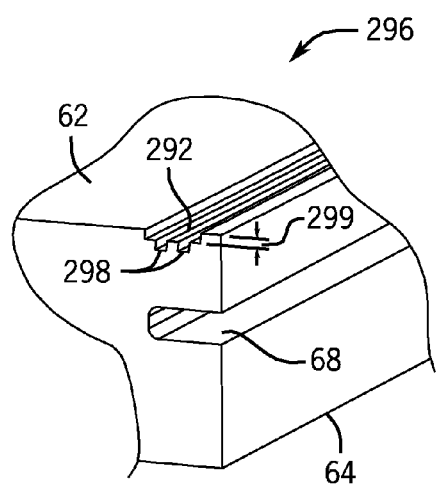
FIG. 23 is a cutaway view of an embodiment of the shroud segment of FIG. 22 after recesses have been formed in the grooved flats.

FIG. 23 illustrates an embodiment of a shroud segment 296 that has been machined or otherwise treated to form recesses 298 in the platform recess 292 at an offset distance 299 from the first surface 62. The distance 299 may be the depth of the platform recess 292, and may be between approximately 4 mm and 50 μm, 3.75 mm and 100 μm, or 3.5 mm and 200 μm. In other embodiments, the recess 292 may be less than approximately 2 mm, 1.75 mm, 1.5 mm, 1 mm, 750 μm, 500 μm, 400 μm, 300 μm, 250 μm, 200 μm, 150 μm, or 100 μm. As noted above, the recesses 298 may have widths between approximately 50 μm and 4 mm and depths between approximately 50 μm and 4 mm. For example, the recesses 298 may have widths and/or depths between approximately 150 μm and 3.5 mm, between approximately 250 μm and 3.25 mm, or between approximately 300 μm and 2 mm.

Figure 24:
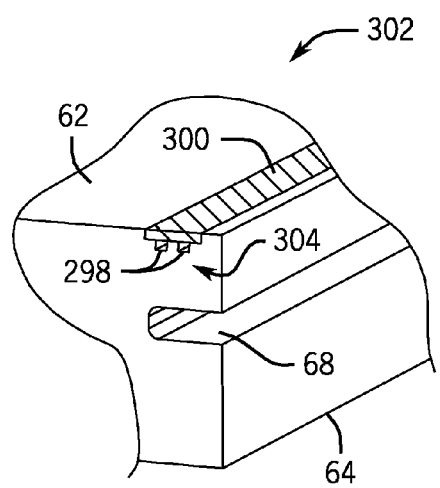
FIG. 24 is a cutaway view of en embodiment of the shroud segment of FIG. 23 after a braze layer has been applied in the grooved flats to cover the recesses to form the cooling channels.

As illustrated in FIG. 24, the recesses 298 may be covered with a cover layer 300 to generate a shroud segment 302 having a pair of cooling channels 304. As noted above, the cooling channels 304 may be microchannels having the dimensions mentioned above with respect to the recesses 298. The layer 300 may be a metallic layer that is brazed, welded, or otherwise secured to the shroud segment 302. As an example, the metallic layer may be of similar material to the base shroud. As a further example, the metallic layer may include alloys, such as nickel or cobalt base superalloys. The layer 300, after being secured to the shroud segment 302, may be ground, milled, or otherwise machined down to a desired tolerance. Indeed, in certain embodiments, the cover layer 300 may have a thickness that is substantially the same as the depth described above for the offset distance 299, which is less than approximately 4 mm, such as between approximately 4 mm and 50 μm, 3.75 mm and 100 μm, or 3.5 mm and 200 μm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a shroud segment configured to at least partially surround a turbine blade of a turbine engine, wherein the shroud segment comprises:
a body having a first surface configured to face toward the turbine blade and generally opposed second surfaces each configured to face toward a respective adjacent shroud segment, wherein a respective edge of the body is formed by an intersection of the first surface and each of the second surfaces;
a respective seal slot formed in each of the second surfaces of the body;
a first microchannel disposed in the first surface and having first and second longitudinal portions each extending along a longitudinal direction of the body between a leading edge and a trailing edge of the body proximate to the respective edge of the body and positioned between the respective seal slot and the first surface, wherein the first microchannel includes a crosswise portion proximate to the leading edge of the body and fluidly connecting the first and second longitudinal portions, and wherein the first microchannel is defined by a layer disposed over a microchannel recess formed in the first surface, and the microchannel recess extends along the first surface such that the first microchannel is configured to flow the cooling fluid along the first surface to cool the respective seal slots; and
a second microchannel disposed in the first surface and having first and second longitudinal portions each extending along the longitudinal direction of the body between the leading edge and the trailing edge of the body proximate to the first microchannel, wherein the second microchannel includes a crosswise portion proximate to the crosswise portion of the first microchannel and fluidly connecting the first and second longitudinal portions of the second microchannel.

2. The system of claim 1, wherein the first microchannel has a width, a depth, and a length, wherein the width or the depth is between approximately 50 microns and 4 millimeters.

3. The system of claim 2, wherein the first microchannel is disposed at an offset distance from the first surface or at least one of the generally opposed second surfaces of the body, and the offset distance is between approximately 4 millimeters and 50 microns.

4. The system of claim 2, wherein the shroud segment comprises an orifice extending from a third surface and into a central region of the crosswise portion of the first microchannel in a first direction, and the orifice has a diameter of between approximately 4 millimeters and 50 microns, wherein the third surface is configured to face away from the turbine blade, and the orifice is configured to enable the first microchannel to receive the cooling fluid during operation as the cooling fluid flows along the third surface, wherein the first microchannel is configured to flow the cooling fluid along the first surface at least in a second direction, and the first and second directions are different.

5. The system of claim 1, wherein the layer comprises a coating extending along the first surface or the second surface of the body.

6. The system of claim 1, wherein the layer is a metallic cover insert disposed within a cover recess having the microchannel recess, wherein the metallic cover insert is joined to the body of the shroud segment.

7. The system of claim 1, wherein the first microchannel comprises a section that runs substantially parallel with respect to the edge, a section that runs angled with respect to the edge, a section that runs substantially perpendicular with respect to the edge, or any combination thereof.

8. The system of claim 1, comprising a third microchannel disposed in one of the generally opposed second surfaces of the body and proximate to one respective edge of the body, wherein the third microchannel is positioned between the respective seal slot and the first surface and extends along the one second surface such that the third microchannel is configured to flow the cooling fluid along the one second surface to cool the respective seal slot.

9. The system of claim 1, wherein an inlet extends from a third surface configured to face away from the turbine blade and into the crosswise portion to provide the cooling fluid to the first microchannel.

10. The system of claim 1, wherein a first inlet extends from a third surface configured to face away from the turbine blade and into the crosswise portion of the first microchannel to provide the cooling fluid to the first microchannel, and a second inlet extends from the third surface and into the crosswise portion of the second microchannel to provide the cooling fluid to the second microchannel.

11. A system, comprising:
a turbine shroud segment, comprising:
a body having a seal slot formed in a first surface of the body, wherein the first surface is configured to face toward an adjacent turbine shroud segment; and
a plurality of microchannels disposed in the body and extending generally along a longitudinal direction of the body, wherein the plurality of microchannels is configured to flow a cooling fluid through the body to cool the seal slot; and
wherein a first microchannel of the plurality of microchannels comprises a first layer disposed over a first microchannel recess formed in and extending along the first surface of the body proximate the seal slot, a second microchannel of the plurality of microchannels comprises a second layer disposed over a second microchannel recess formed in and extending along a second surface of the body that is configured to face toward a turbine blade of the turbine engine, and a third microchannel of the plurality of microchannels comprises a third layer disposed over a third microchannel recess formed in and extending along the second surface of the body;
wherein the second microchannel comprises a first longitudinal portion and a second longitudinal portion each extending between a leading edge and a trailing edge of the body and a crosswise portion disposed proximate to the leading edge of the body and fluidly connecting the first and second longitudinal portions of the second microchannel, and wherein an inlet extends from a third surface configured to face away from the turbine blade and into the crosswise portion of the second microchannel to provide the cooling fluid to the second microchannel;
wherein the third microchannel comprises a first longitudinal portion and a second longitudinal portion each extending between the leading edge and the trailing edge of the body proximate to the second microchannel, wherein the third microchannel includes a crosswise portion proximate to the crosswise portion of the second microchannel and fluidly connecting the first and second longitudinal portions of the third microchannel.

12. The system of claim 11, wherein each microchannel of the plurality of microchannels has a width, a depth, and a length, wherein the width is between approximately 50 microns and 4 millimeters, and the depth is between approximately 50 microns and 4 millimeters.

13. The system of claim 11, wherein the first microchannel is positioned between the seal slot and the third surface of the turbine shroud segment configured to face away from the turbine blade of a turbine engine.

14. The system of claim 11, wherein the first microchannel is positioned between the seal slot and the second surface of the turbine shroud segment.

15. A method comprising:
forming a first microchannel recess in a first surface of a turbine shroud segment of a turbine engine, the first microchannel recess comprising a first longitudinal portion and a second longitudinal portion each extending generally along a longitudinal direction between a leading edge and a trailing edge of the turbine shroud segment and a crosswise portion disposed proximate to the leading edge and fluidly coupling the first longitudinal portion of the first microchannel recess to the second longitudinal portion of the first microchannel recess, wherein the first surface is configured to face toward a turbine blade of the turbine engine and one of the first or second longitudinal portions of the first microchannel recess is positioned between the first surface and a seal slot formed in a second surface of the turbine shroud segment configured to face toward an additional turbine shroud segment;

forming a second microchannel recess in the first surface of the turbine shroud segment of the turbine engine, the second microchannel recess comprising a first longitudinal portion and a second longitudinal portion each extending generally along the longitudinal direction between the leading edge and the trailing edge of the turbine shroud segment proximate to the first microchannel recess and a crosswise portion disposed proximate to the crosswise portion of the first microchannel recess and fluidly coupling the first longitudinal portion of the second microchannel recess to the second longitudinal portion of the second microchannel recess; and covering the first microchannel recess to define a first microchannel cooling passage configured to cool the seal slot of the turbine shroud segment and the second microchannel recess to define a second microchannel cooling passage configured to cool the seal slot of the turbine shroud segment.

16. The method of claim 15, comprising forming an inlet between a third surface configured to face away from the turbine blade and the crosswise portion of the first microchannel recess to facilitate flow of a cooling fluid to the first microchannel cooling passage.

17. The method of claim 15, comprising forming a third microchannel recess in the second surface of the turbine shroud segment, the third microchannel recess extending generally along the longitudinal direction of the turbine shroud segment.

18. The method of claim 17, wherein forming the first third microchannel recess comprises machining the second surface to form the third microchannel recess at a depth or a width between approximately 4 millimeters and 50 microns at a position proximate the seal slot of the turbine shroud segment.

19. The method of claim 18, wherein the seal slot comprises a recess in the second surface, wherein the seal slot is positioned between the third microchannel recess and the first surface of the turbine shroud segment.

20. The method of claim 18, wherein the seal slot comprises a recess in the first second surface, wherein the seal slot is positioned between the third microchannel and a third surface of the turbine shroud segment configured to face away from the turbine blade of the turbine engine.

* * * * *